United States Patent

Ong

(10) Patent No.: US 8,966,141 B2
(45) Date of Patent: Feb. 24, 2015

(54) VIRTUAL PIPE FOR WIRE ADAPTER COMMUNICATIONS

(75) Inventor: Ping-Wen Ong, Laguna Niguel, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 1674 days.

(21) Appl. No.: 12/050,060

(22) Filed: Mar. 17, 2008

(65) Prior Publication Data

US 2008/0228962 A1    Sep. 18, 2008

Related U.S. Application Data

(60) Provisional application No. 60/895,090, filed on Mar. 15, 2007.

(51) Int. Cl.
*G06F 13/12*    (2006.01)
*G06F 13/38*    (2006.01)
*G06F 13/42*    (2006.01)

(52) U.S. Cl.
CPC .................................. *G06F 13/426* (2013.01)
USPC .......................................................... 710/62

(58) Field of Classification Search
USPC .......................................................... 710/62
See application file for complete search history.

(56) References Cited

U.S. PATENT DOCUMENTS

| 6,247,057 | B1 * | 6/2001 | Barrera, III | 709/229 |
| 7,076,239 | B2 | 7/2006 | Kirkup et al. | |
| 2007/0233922 | A1 * | 10/2007 | Ismail et al. | 710/112 |
| 2008/0162741 | A1 * | 7/2008 | Christison et al. | 710/18 |
| 2008/0320587 | A1 | 12/2008 | Vauclair et al. | |

OTHER PUBLICATIONS

Wireless Universal Serial Bus Specification May 12th, 2005 Rev. 1.0 pp. 11, 37 and 38.*
Agere, Hewlett-Packard, Intel, Microsoft, NEC, Philips, and Samsung; "Wireless Universal Serial bus Specification," May 12, 2005, Revision 1.0.

* cited by examiner

*Primary Examiner* — Elias Mamo
(74) *Attorney, Agent, or Firm* — McClure, Qualey & Rodack, LLP

(57) ABSTRACT

A wire adapter in a Wireless Universal Serial Bus configuration includes endpoints bound to communication constructs for communicating with discrete identified endpoints of downstream devices. A Virtual Pipe system is provided for the wire adapter to manage the communications pathways between a host and a downstream device connected to the wire adapter. The system provides for establishing data pathways through previously unused endpoints in the wire adapter.

4 Claims, 7 Drawing Sheets

VIRTUAL PIPE FOR WIRE ADAPTER COMMUNICATIONS

CROSS-REFERENCE TO RELATED APPLICATION(S)

The present application claims priority to U.S. Provisional Patent Application No. 60/895,090, filed Mar. 15, 2007, the entire contents of which are incorporated herein by reference.

BACKGROUND OF THE INVENTION

The present invention relates generally to wireless communications, and more particularly to wireless communications including a normally wired device using a wire adapter.

As new and innovative digital devices are being developed, an easy and versatile medium of communication between these digital devices becomes more and more useful. The USB protocol has become one of the most popular of these digital communication mediums, as it is versatile and compatible with most digital devices. USB has become one of the most prevalent mediums of digital communication. Most digital devices are typically made USB compatible, and those which are not can generally be modified or adapted to be USB compatible. USB devices are generally coupled to a USB host through a USB connector. Through this connection, not only can the USB device communicate with the USB host, but in many instances can receive power from the USB host as well.

Many of the new digital communications devices being developed are now built with wireless capabilities or can be adapted or modified to have wireless capabilities. Digital devices which could previously only communicate through cables or other physical wire-type mediums are becoming likely candidates for this type of wireless communication. The USB protocol is no exception, with the development of the Wireless USB protocol. However, the Wireless USB interface may provide constraints which reduce efficiency.

BRIEF SUMMARY OF THE INVENTION

The invention provides for communication by a wired host using a wire adapter for wireless communication. In one aspect, the invention provides a method of providing data over a data path including a wireless portion, comprising requesting data communication using a remote pipe between a host and a device, the request specifying an endpoint of the device; binding the remote pipe to an unused endpoint of a wire adapter; and data communicating using the bound endpoint of the wire adapter.

In another aspect the invention provides a method of assisting in data communication by a wire adapter, the wire adapter configured to receive information from a host over a wired link and to transmit at least some of the data wirelessly, comprising receiving a request from a host for a remote pipe for bursty communications with an endpoint of a device; providing an indication to the host of unused endpoints of the wire adapter; receiving a request to bind the remote pipe to one of the unused endpoints of the wire adapter; receiving data identified as being directed to the bound endpoint of the wire adapter; and transmitting at least some of the received data along with an indication of the device and the endpoint of the device.

In another aspect the invention provides a method of assisting in data communication by a wire adapter, the wire adapter configured to receive information from a host over a wired link and to transmit at least some of the data wirelessly, comprising receiving a request from a host for a remote pipe for bursty communications with an endpoint of a device; providing an indication to the host of unused endpoints of the wire adapter; receiving a request to bind the remote pipe to one of the unused endpoints of the wire adapter; receiving data identified as being directed to the bound endpoint of the wire adapter; and transmitting at least some of the received data along with an indication of the device and the endpoint of the device.

In yet another aspect the invention provides a method of communicating information between a host and a plurality of functions on one or more devices, each of the functions identifiable by a device and an endpoint, comprising providing a wired adapter configured for wired communications with a host and wireless communications with a receiver configured for providing received information to the one or more devices, the wired adapter having a plurality of endpoints; identifying at least some of the plurality of endpoints of the wired adapter for use in communications with corresponding ones of the functions, with each of the identified endpoints of the wired adapter identified for use with no more than one of the functions; receiving by the wired adapter of information from the host, the information being identified as being for various ones of the identified endpoints of the wired adapter; and transmitting by the wired adapter of at least some of the received information, the transmitted information including an indication of the function intended for receipt of the information, the function dependent on the wired adapter endpoint for which the information was identified.

These and other aspects of the invention are more fully comprehended upon review of this disclosure.

DETAILED DESCRIPTION

Figure 1:
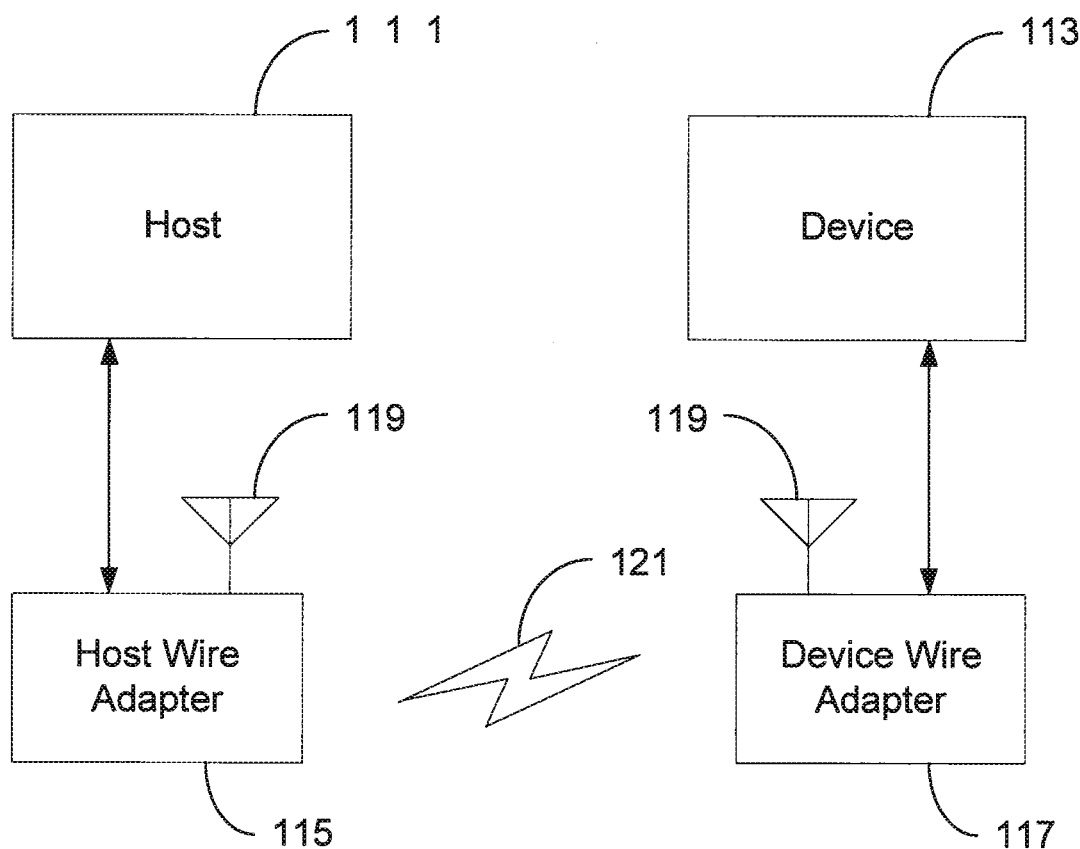
FIG. 1 is an illustration of a USB host and a USB device communicating wirelessly in accordance with aspects of the invention.

FIG. 1 illustrates a USB host 111 and a USB device 113 communicating wirelessly in accordance with aspects of the invention. Each of the USB host and the USB device are coupled to a wire adapter, with the USB host coupled to a host wire adapter 119 and the USB device coupled to a device wire adapter 117. The coupling with the wire adapters is usually a wired connection, with it being recognized that circuit traces, connectors, or other physical connections may be considered a wired connection, even if the physical connection is provided other than using actual wires.

Host wire adapters are generally used to add Wireless USB capabilities to a USB host, and device wire adapters are generally used to add Wireless USB capabilities to a USB device. Components upstream may be considered hosts, while components downstream may be considered devices of each respective host. Both the host wire adapter and the device wire adapter include wireless communication circuitry 119 for wireless communication 121.

The wire adapters are themselves USB devices, and the host and/or the device may communicate with the wire adapters using USB compliant protocols. Often USB compliant communication protocols specify both a device and a function of the device for which data is intended. The function of the device may be a software program executing on the device, a hardware component such as a display of the device, or some subset of either of those. The function of the device for which data is intended is generally specified as an endpoint. Thus, USB compliant communications often specify a device and an endpoint intended as a recipient of the communications.

In the embodiment of FIG. 1, the host, for example, communicates to the host wire adapter information intended for a function of the device. In accordance with aspects of the invention, the host communicates the information specifying a preidentified endpoint of the host wire adapter. The host wire adapter forwards, via wireless transmission, all information specified as intended for the preidentified endpoint of the host wire adapter to an endpoint associated with the function of the device. Thus, for example, the host specifies an endpoint of the wire adapter for use in communications with an endpoint of an intended ultimate recipient of the communications, and the endpoint of the wire adapter may therefore be considered bound to the particular communication path. Each wire adapter has a predefined number of unused endpoints which can be used to establish wireless connections to other components. A typical wire adapter has at least 27 unused endpoints.

In many instances communications are facilitated by use of remote pipes, for example as discussed in the Wireless Universal Serial Bus Specification, version 1.0, dated May 12, 2005, incorporated in its entirety herein. Remote pipes are abstractions to establish data paths to connect hosts and devices wirelessly using wire adapters in the context of USB communications. Remote pipes may be bidirectional, but typically are used by wire adapters for either OUT traffic to, or IN traffic from, downstream devices. Generally, a host wire adapter, or more commonly a host, assigns a remote pipe to an endpoint of a device. The host transmits a data packet to the wire adapter, the data packet, for example, may be preceded by transfer information, for example remote pipe information, including information as to the desired destination of the data packet. The host wire adapter processes the transfer information and forwards the data packet to the desired destination.

In accordance with the invention, an endpoint of the wire adapter is bound to a particular remote pipe, such that the wire adapter endpoint, as long as so bound, is used exclusively for the remote pipe associated with the desired destination. Thus, data received by the wire adapter indicated as going to the bound endpoint of the wire adapter is forwarded by the wire adapter in accordance with the particular remote pipe. This tying, or binding, of a wire adapter endpoint and remote pipe may be considered to create a virtual pipe, or VPipe.

Figure 2:
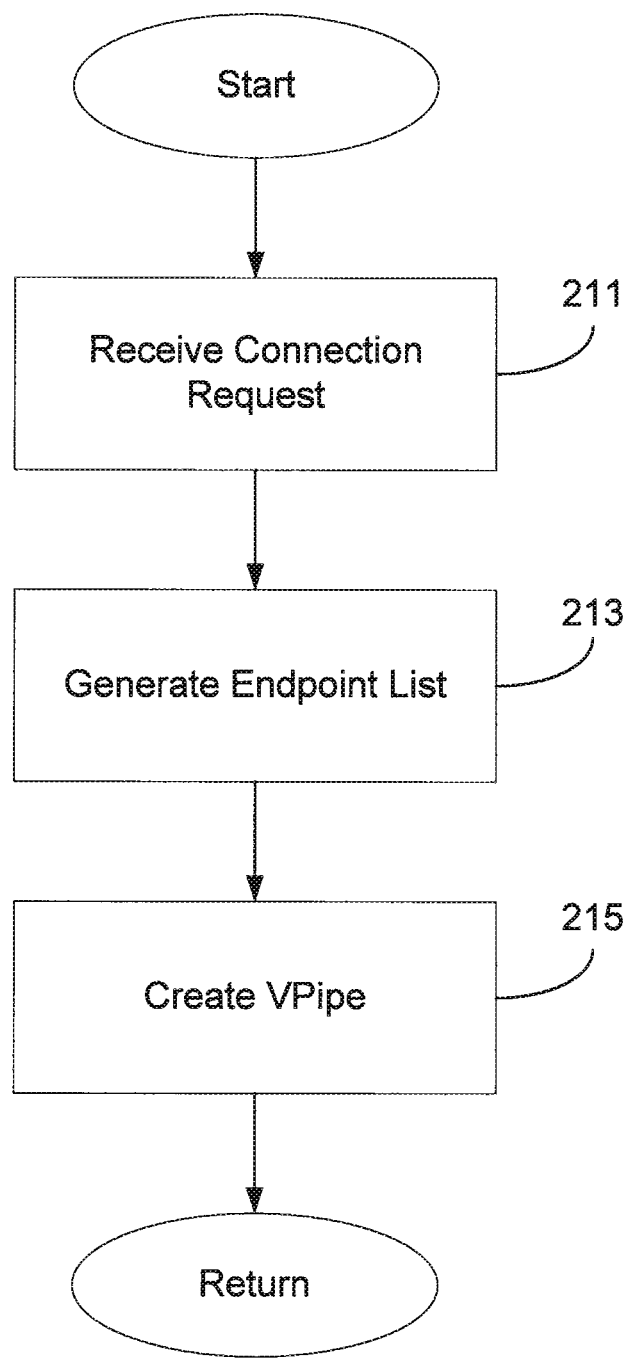
FIG. 2 is a flow diagram of a process of dynamically binding unused endpoints in a wire adapter to downstream devices in accordance with various embodiments of the invention.

FIG. 2 is a flow diagram of a process of dynamically binding unused endpoints in a wire adapter to downstream devices in accordance with various embodiments of the invention. In some embodiments the process may be performed by circuitry or firmware of the wire adapter, in some embodiments the process may be performed by circuitry of or program instructions executing on a processor of a host, and in some embodiments the process may be performed by a combination of elements of the wire adapter and the host. In some embodiments, the wire adapter may expose a VPipe interface, comprising all the unused endpoints in the wire adapter, to a host, and the wire adapter may manage connections between the endpoints and downstream devices. In other embodiments, a driver may be installed to manage and store the device connection information.

In block 211, the process receives a connection request. A host may send a request to a host wire adapter to establish a wireless connection to a downstream device to which the host will be transmitting data. The request may include connection information pertaining to the downstream device to help the host wire adapter locate and identify the downstream device. In some embodiments, the connection information may identify a device wire adapter associated with the downstream device, where information sent to the device wire adapter may then be transmitted to the downstream device via a wired connection.

In block 213, the process generates an endpoint list comprising unused endpoints in a wire adapter. In most embodiments, the unused endpoints in the wire adapter may be used to establish new wireless data communication pathways with other components. In some embodiments, the wire adapter exposes a VPipe interface to the host, with the VPipe interface comprising the unused endpoints in the wire adapter. In these embodiments, the wire adapter may include current status information on all the endpoints in the VPipe interface. In some embodiments, for example, embodiments where a driver is installed in an upstream host to manage the connections between the wire adapter and downstream devices, the list indicating unused endpoints on the wire adapter may be provided to the driver on the host.

In block 215, the process creates a VPipe. The VPipe provides a data path between the host and a downstream device through the wire adapter. A VPipe is created using an unused endpoint of the wire adapter. In most embodiments, the VPipe uses a remote pipe framework, with a remote pipe bound to one of the unused wire adapter endpoints. The VPipe is assigned an associated function of a downstream device, in most embodiments, the particular function of a device to which the host will be transmitting data. The VPipe is dedicated to communication with the particular function and device.

A wireless communication pathway is thereby created between a host and a downstream device. The host may transmit data packets to a function of a downstream device via the VPipe associated with the downstream device. When a host wants to transmit a data packet to the function of the downstream device, the host may utilize the VPipe by sending the data packet to the endpoint of the wire adapter bound by the VPipe associated with the device, and the wire adapter routes the data packet to the endpoint of the device. In some embodiments, the data packet does not include, or is not accompanied by, transfer information pertaining to the desired destination function (indicated by device endpoint) and device of the data packet. In some embodiments less then all of the endpoints of the wire adapter are available for creation of VPipes. For example, in some embodiments one endpoint may be reserved for remote pipe (RPipe) traffic IN and one endpoint reserved for RPipe traffic OUT. In addition in some embodiments wire adapter endpoint availability for VPipes may be restricted by type of data transfer. For example, in some embodiments a first plurality, for example 8, of endpoints may be reserved for bulk-in, a second plurality, for example 8, may be reserved for bulk-out, a third plurality, for example 2, may be reserved for interrupt in, a fourth plurality, for example 2, may be reserved for isochronous-in, and a fifth plurality, for example 2, may be reserved for isochronous-out.

Figure 3:
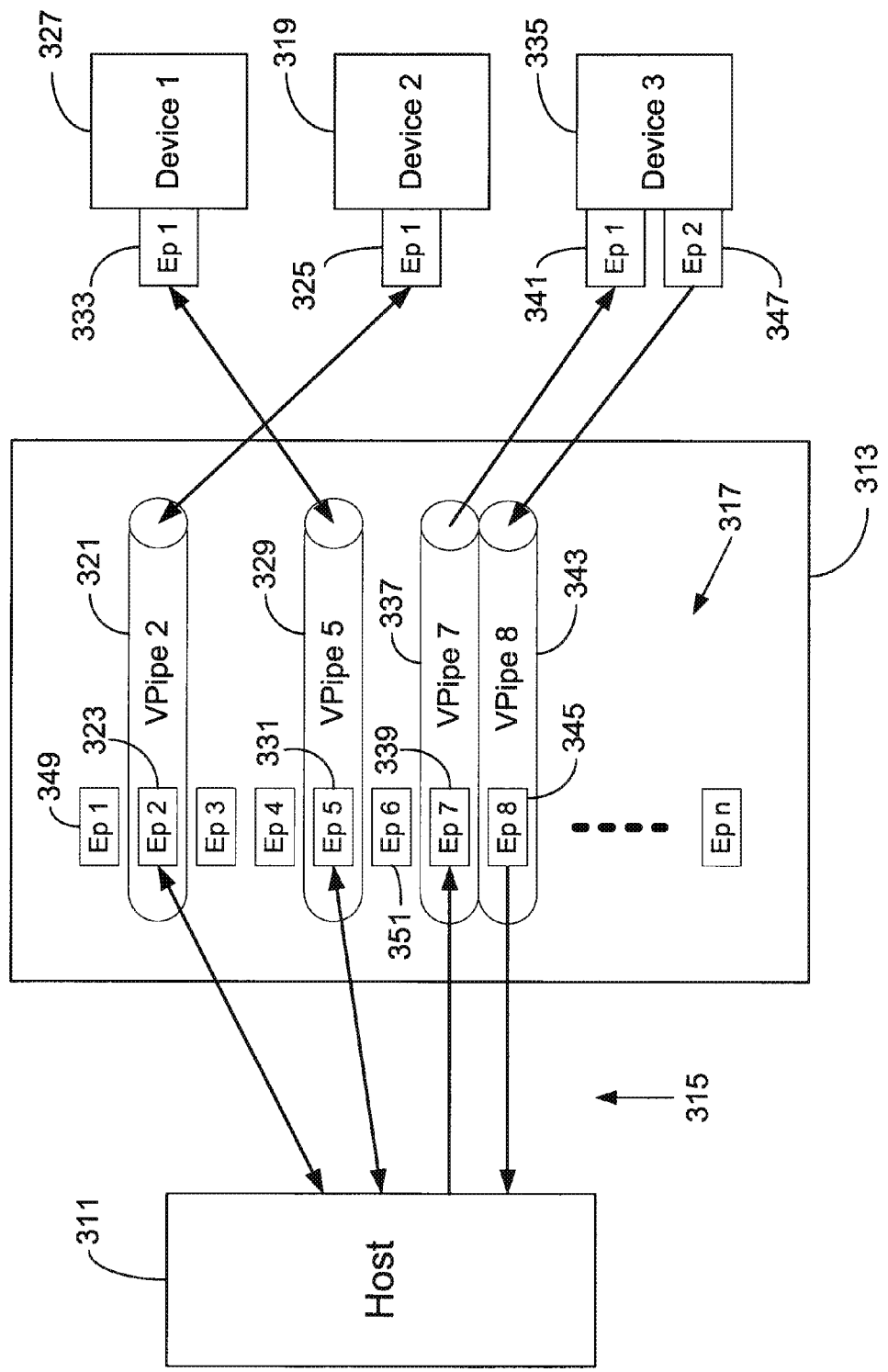
FIG. 3 is a Wireless USB system with a host wirelessly communicating with multiple devices through a wire adapter in accordance with aspects of the invention.

FIG. 3 is a Wireless USB system with a host wirelessly communicating with multiple devices through a wire adapter in accordance with aspects of the invention. The system includes a host 311 communicating with a wire adapter 313, generally through a wired connection 315. The wire adapter, in turn, communicates wirelessly with a plurality of downstream devices. In some embodiments, the wire adapter wirelessly communicates with device wire adapters associated with each respective device, or a device wire adapter common to all the devices.

Each wire adapter has n number of endpoints useable for data communication purposes. The endpoints may be viewed as channels or addresses on the wire adapter which serve as reference locations. In most wire adapter embodiments, at least 27 unused endpoints are available. In some embodiments, different ones of the endpoints are available for different purposes.

In certain embodiments of the invention, a VPipe interface 317 is defined, comprising all the unused endpoints in the wire adapter. The wire adapter receives a transmission request, and an unused endpoint in the VPipe interface is arbitrarily selected as an address at which a new VPipe is to be created. The VPipe is paired to the desired device. The VPipe may be constructed using a remote pipe, for example as in the Wireless USB protocol. Referring now to FIG. 3, the host may send a request to the wire adapter to establish a data communication pathway from the host to device 2 319, and more particularly to a function of device 2 identified as endpoint 1 325 of device 2. A VPipe 321 may be created using endpoint Ep 2 323 of the wire adapter, and the VPipe may be assigned to communicate exclusively with an endpoint Ep 1 located on device 2. Likewise, the host may request the wire adapter to create a wireless data pathway to device 1 327, and more particularly to a function of device 1 identified as endpoint 1 333 of device 1. A VPipe 329 may be created and bound to endpoint Ep 5 331 of the VPipe interface, with the VPipe associated with endpoint Ep 1 located on device 1. VPipes may be allocated or deallocated as desired in many embodiments, allowing for dynamic VPipe allocation.

If a VPipe has already been paired with a downstream device, memory in the wire adapter may hold information pertaining to the pairing. The host may therefore send any data packets intended for a downstream device using the VPipe paired with the downstream device. In most embodiments, data is sent to the endpoint of the wire adapter bound by the VPipe, and the wire adapter forwards the data or traffic to the appropriate downstream device upon receipt of the data or traffic. Similarly, IN traffic may be obtained by requesting a read of the wire adapter endpoint bound for the in traffic VPipe. The remaining unused endpoints of the wire adapter, for example, endpoints Ep 1 349 or Ep 6 351, are all potential endpoints which new VPipes may bind if additional downstream devices are to be connected.

VPipes may be managed in a variety of ways. For example, the host may be given information about the VPipe associations prior to transmission. The host may use, for example, VPipe 5 when the host wants the data to be sent to device 2. Alternatively, VPipe association information may be stored in memory located in the wire adapter. When the host sends data destined for a particular device, control circuitry in the wire adapter may process the data and route the data to the appropriate VPipe for transmission to the intended downstream device. A third possible configuration implements a USB compatible driver, which may be installed on the host or on the wire adapter. The USB compatible driver may hold the VPipe association information, and incoming data is routed based on the information stored in the driver.

Preferably, endpoint configurations may be dynamically set and changed based on the priorities of each individual data transfer, to increase efficiency and versatility of the VPipe system. For example, in the embodiment of FIG. 3, the data pathways from the wire adapter to device 1 and device 2 are illustrated as bidirectional data pathways. In this embodiment, endpoint Ep 2 and endpoint Ep 5 may be configurable, and may be configured based on the type of data each respective endpoint receives.

In other embodiments, endpoints may only be configured to send data in a single direction. In these embodiments, multiple VPipes may be created to facilitate communication between the wire adapter and a downstream device, where at least one VPipe is dedicated to OUT traffic to the device, and at least one VPipe is dedicated to IN traffic from the device. Device 3 335 communicates with the wire adapter in this manner. VPipe 7 337 has been created and bound to endpoint Ep 7 339 of the wire adapter, and associated with endpoint Ep 1 341 of device 3 to facilitate outgoing traffic to device 3. The host may send data bound for device 3 to Ep 7 of the wire adapter, which automatically forwards the data to Ep 1 of device 3. VPipe 8 343 has been created and bound to endpoint Ep 8 345 of the wire adapter, and paired with endpoint Ep 2 347 of device 3. Device 3 may send data intended for the host to Ep 8 of the wire adapter, which may then forward the data to the host. In some embodiments a higher level protocol is used to provide flow information regarding out traffic reaching an ultimate device endpoint. For example, in some embodiments a SCSI protocol for mass storage devices may be used, with for example CSW IN, or a last CSW IN, being used to determine results of data transfer.

By managing communication pathways using VPipes, Wireless USB transmissions may reduce overhead associated with transfer instructions or transfer command packets employed in typical Wireless USB interfaces. By establishing communication pathways within the wire adapter with a reduced amount of transfer instructions, the potential VPipe throughput can reach double or triple the typical remote pipe throughput. Since endpoint implementation and data transfer rates remain unchanged, any endpoint which is a candidate to be used as a remote pipe is also a candidate to be used as a VPipe.

In some embodiments, wire adapters employ fixed interfaces instead of dynamic interfaces, where endpoint types are not set and changed based on the nature of the data being sent. In these embodiments, endpoint types are pre-assigned at the time of enumeration and are not modified thereafter. Endpoint type allocations are typically based on the intended use or implementation of the wire adapter. VPipes may be difficult to implement or prove ineffective if, for example, a fixed interface includes a large number of low throughput endpoints. If, however, there are many high throughput endpoints available, VPipes may greatly improve the throughput and efficiency of the wire adapter.

Figure 4:
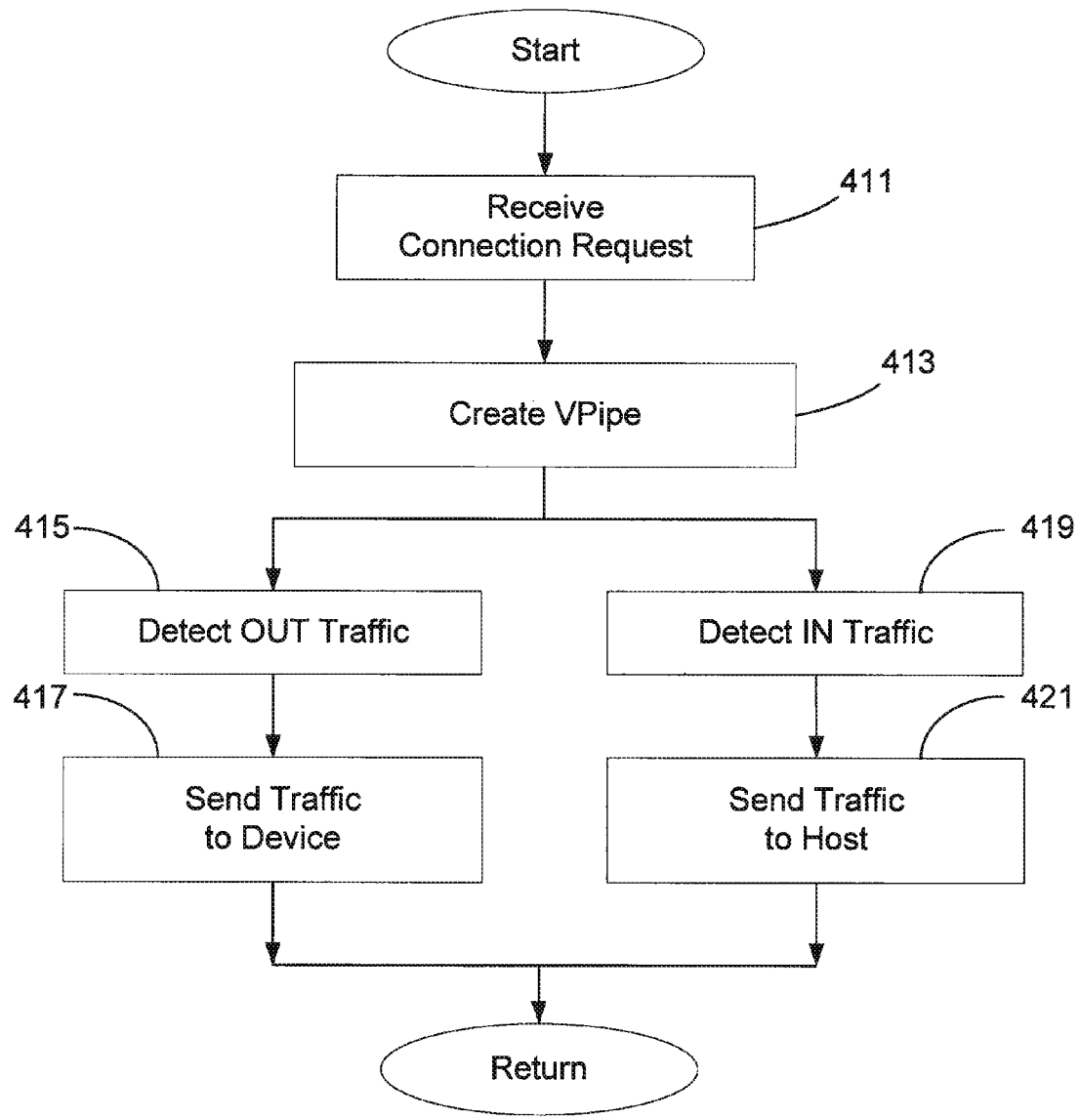
FIG. 4 is a flow diagram of a process for establishing a Virtual Pipe connection in accordance with aspects of the invention.

FIG. 4 is a flow diagram of a process for establishing and using a VPipe in accordance with various embodiments of the invention. In particular embodiments, the process is performed in the context of creating a dynamic data transfer medium between a host and a downstream device. In some embodiments, the process may be performed, for example, to establish the system illustrated in FIG. 3. In block 411, the wire adapter receives a data transmission request from a host.

In some embodiments, the host may to send a remote pipe request consistent with the existing Wireless USB protocol. The convention may be maintained to more easily integrate the VPipe within the Wireless USB standard. The host sends a transmission request to the host wire adapter, including instructions on how to configure the communication pathway, what type of data transfer is required, and the address of an endpoint of the desired downstream device. A VPipe may be established using the information received from the host, with minimal modification to the host and host software.

In block 413, the VPipe interface creates a VPipe and binds it to an unused endpoint in the VPipe interface in accordance with the transmission request received from the host. In most embodiments, the newly created VPipe is created in a similar manner as a remote pipe is created in existing Wireless USB protocol. The newly created VPipe is associated with an endpoint on the desired downstream device. The wire adapter may communicate wirelessly with the endpoint of the device via the resulting VPipe, sending data to and receiving data from the endpoint on the device. The association between the VPipe and the device endpoint is recorded and saved. In embodiments where a driver controlling the VPipe interface has been installed onto the host, the wire adapter may transmit the VPipe association information to the host.

In some embodiments, creating a VPipe may also include setting or selecting an endpoint type for the underlying endpoint to facilitate more efficient data transmission. Different endpoint types are used for different data transfers. Generally, in embodiments of the invention, VPipes are created at bulk transfer endpoints. Of the different endpoint types, bulk transfer endpoints have the highest throughput and transfer the largest amounts of data per data packet. In embodiments where endpoint types may be dynamically assigned, endpoints used for VPipes are typically assigned as bulk transfer endpoints. In some embodiments, the system may dynamically modify the endpoint type as the VPipe receives data, to most effectively accommodate the different types of data that the endpoint may receive.

In block 415, the process detects OUT traffic. This traffic represents data being sent by the host, destined for a particular downstream device the VPipe is associated with. The host may send the data directly to the VPipe associated with the desired destination. In some embodiments, a driver installed in the host memory may manage the VPipe associations with downstream devices. The host may send data packets intended for a particular device, and the driver may route the data packets to the associated VPipe with little or no transfer or destination information.

In block 417, the process sends the traffic from the VPipe to the endpoint of the downstream device associated with the VPipe. In some embodiments, the traffic may comprise the data the host intended to deliver to the downstream device. In some embodiments, the data packets do not include or have attached transfer or routing information identifying the intended destination device, as the control circuitry in the wire adapter automatically sends any OUT traffic it receives at the VPipe to the associated device. In other embodiments, particularly those embodiments where VPipe management occurs on the wire adapter, the data packets may be accompanied with minimal destination information, the destination information including either the VPipe where the data packets are to be delivered, or the device the data packets are intended for. The control circuitry on the wire adapter may process the routing information to determine the correct VPipe to deliver the data packets, and the traffic is sent from the VPipe to its associated device endpoint upon receipt of the traffic. In embodiments with a dynamic VPipe system, the process may involve, for example, determining the nature and priority of the traffic, determining the appropriate endpoint type to facilitate the transfer, and setting the endpoint associated with the VPipe to an appropriate endpoint type setting.

In block 419, the process detects IN traffic. The traffic represents data being sent from a downstream device to an upstream host. A VPipe configured to receive IN traffic detects the IN traffic. In embodiments with dynamic VPipe systems, the endpoint associated with the VPipe is configured to handle both incoming and outgoing traffic. In other embodiments, the endpoint type may either be switched from OUT endpoints to IN endpoints, based vice versa, based on the incoming traffic. In yet other embodiments, separate VPipes may be associated with a downstream device to separately handle OUT and IN traffic. In some embodiments, the IN traffic may be accompanied by a request or similar authorization information for the host to determine whether to accept the IN traffic.

In block 421, the process sends the IN traffic from the VPipe to the host. In most embodiments, the control circuitry of the wire adapter may automatically send the traffic from the VPipe to the host upon receipt from the downstream device. The host determines the source of the traffic based on the association between the VPipe and the downstream device. In embodiments where the traffic includes a transmission request or similar authorization information, the data may be held in the VPipe until the host accepts the traffic. After traffic is delivered to the desired destination, either in block 417 or 421 of the process, the process returns.

Figure 5:
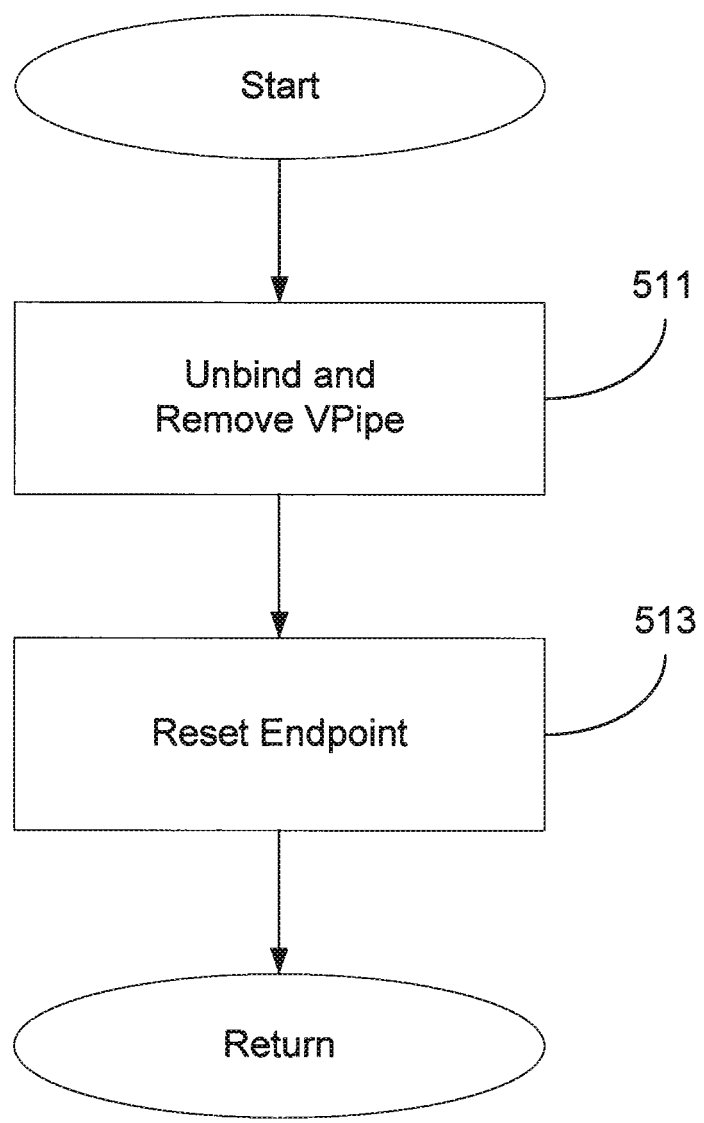
FIG. 5 is a flow diagram of a process for removing a Virtual Pipe in accordance with aspects of the invention.

FIG. 5 is a flow diagram of a process for removing a VPipe in accordance with aspects of the invention. In some embodiments, the VPipe removal process may be performed after a data transfer through a VPipe has been successfully completed, if the properties associated with a particular VPipe are to be modified, or if an error prevents or aborts a transfer. In other embodiments, VPipes may remain in place until removal is authorized by the wire adapter or the host. In some embodiments, unbinding and removing of a particular VPipe may be initiated by a specific vendor request. In block 511, the process unbinds and removes the VPipe. Unbinding and removing of the VPipe may be accomplished, for example, by a driver associated with the VPipe interface, installed in either the wire adapter or the host. In most embodiments of the invention, a VPipe is created based around the remote pipe construct. Therefore, when the VPipe association is removed, configuration information pertaining to a typical remote pipe may remain associated with the endpoint.

In block 513, the wire adapter resets the endpoint as would normally be performed in a typical remote pipe configuration. In most embodiments, the endpoint may be reset so that no configuration information remains, and the endpoint reclaims its status as an unused and available endpoint, ready to receive another VPipe association. After the endpoint is reset, the process returns.

Figure 6:
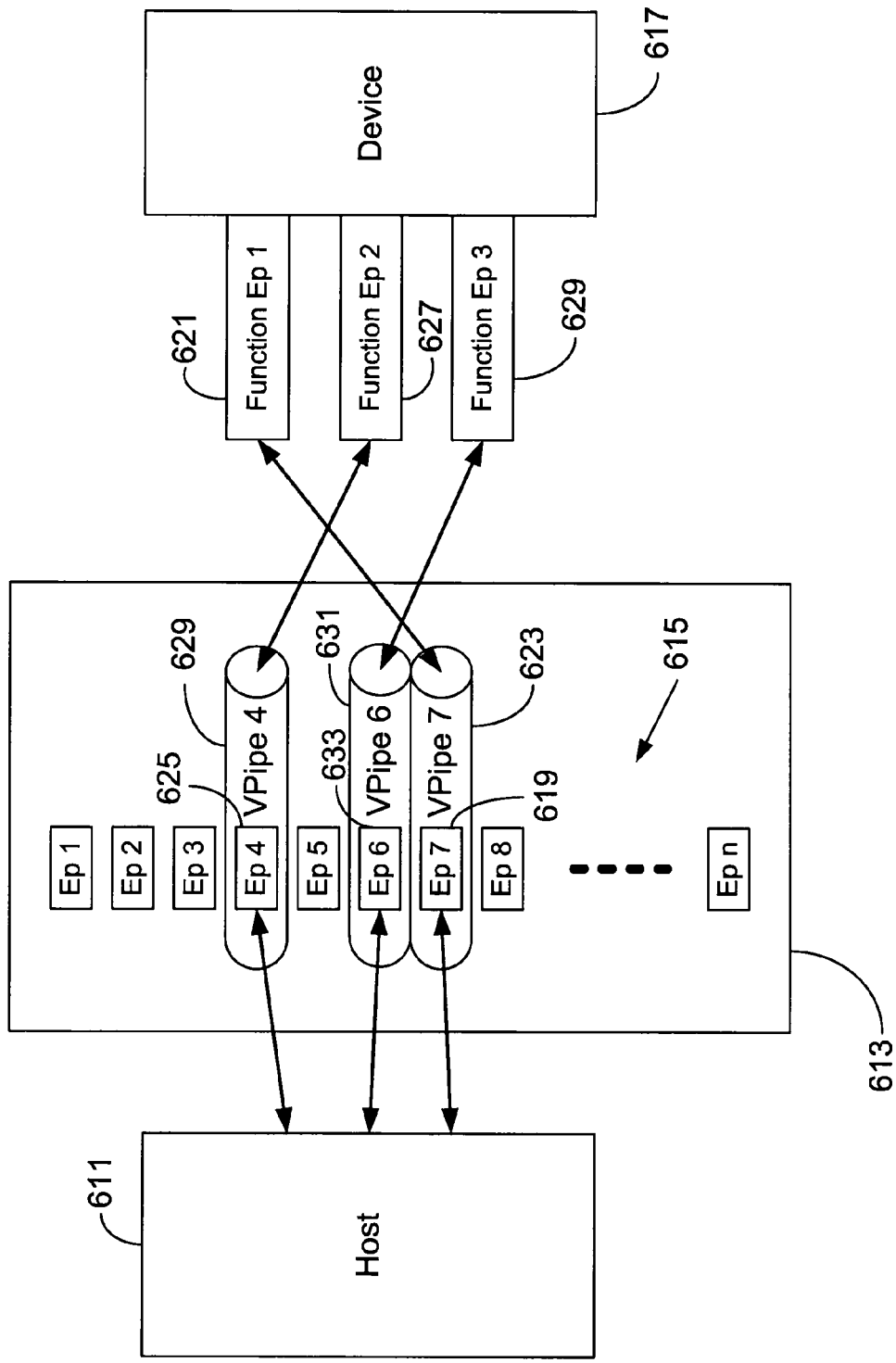
FIG. 6 is a Wireless USB system with a host wirelessly communicating with multiple functions on a single device through a wire adapter in accordance with aspects of the invention.

FIG. 6 is a Wireless USB system with a host wirelessly communicating with multiple functions on a single device through a wire adapter in accordance with aspects of the invention. The system includes a host 611 connected with a wire adapter 613 including a plurality of unused endpoints 615. In certain embodiments of the invention, a VPipe interface is defined as comprising all the unused endpoints in the wire adapter. The wire adapter is wirelessly communicating with a downstream device 617, particularly to a plurality of functions the device may perform.

In addition to being able to manage wireless communication with multiple downstream devices, the VPipe system may also manage multiple wireless connections to a single downstream device. Each individual communication pathway may be mapped to a different function associated with the downstream device. In this manner, a host may wirelessly send and receive information to and from multiple sources within a single device. A host may first request the wire adapter to authorize a data pathway for communicating with a first function 1, of which the device is capable of performing. An unused endpoint in the VPipe interface, for example, endpoint Ep 7 619, is arbitrarily selected as the location for creating and binding a new VPipe, VPipe 7 623. New VPipe 7 is associated with function Ep 1 621 on the device. The host may thereafter wirelessly communicate with function 1 on the device directly via VPipe 7 on the wire adapter.

The host may also want to communicate with a second function, function 2, on the same device. The host may send a transmission request to the wire adapter. The VPipe interface on the wire adapter may assign another unused endpoint from the n number of unused endpoints, for example, endpoint Ep 4 625, to be facilitate communication with function endpoint Ep 2 627 on the device. A VPipe 4 629 is created and bound to endpoint Ep 4, and the VPipe is paired to function Ep 2 of the device. Communication with a third function 3 may be established in a similar manner. In FIG. 6, a data path to function endpoint Ep 3 on the device has been facilitated through VPipe 6 631, bound to endpoint Ep 6 633 in the VPipe interface.

With the three established communication pathways illustrated in FIG. 6, the host may independently communicate with three different functions associated with the downstream device. The host may simultaneously send instructions or data to each of the three function endpoints through the appropriate VPipes associated with each respective function, reducing latency as compared to systems that, for example, only support a single data communication pathway between a host and a host wire adapter.

Figure 7:
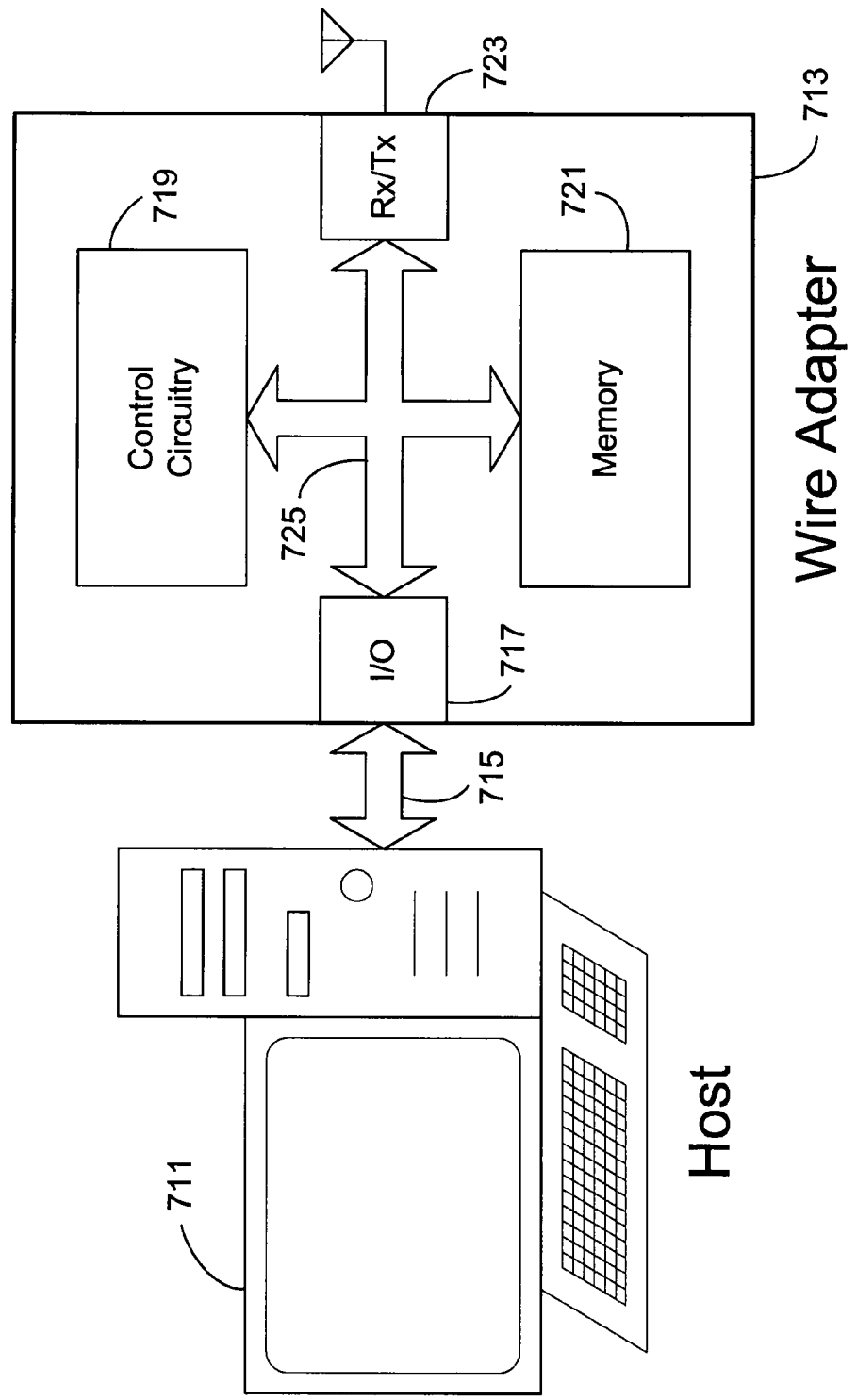
FIG. 7 is a block diagram of a Wireless USB host system in accordance with aspects of an embodiment of the invention.

FIG. 7 is a block diagram of a Wireless USB host system in accordance with aspects of the invention. The system includes a host 711 connected to a host wire adapter 713 through a wired connection 715. The host includes internal components, for example, a processor, a memory, and an input-output port to connect to components such as the host wire adapter. The host in the embodiment of FIG. 7 is illustrated as a host computer, but in other embodiments the host may be any of a variety of different instruments with processing power and memory where wireless communication with downstream devices is desired. Likewise, although the wire adapter is illustrated as an external component of the host, in some embodiments, the wire adapter may be incorporated as an internal component of the host.

In FIG. 7, the host communicates to the wire adapter through a wired connection, which may be connected to an input-output port 717 on the wire adapter. In addition to the input-output port, the internal circuitry of wire adapter also includes control circuitry 719, memory 721, and a wireless Rx/Tx transceiver 723. Other circuitry may also be included in different embodiments of the wire adapter. The components of the wire adapter are coupled to a bus 725, which interconnects the components of the wire adapter with one another.

In embodiments of the invention, the wire adapter includes a plurality of endpoints where transmission pipes may be bound. Status information pertaining to each endpoint may be stored in the memory on the wire adapter, and the control circuitry may be used to manage the endpoint associations. The transceiver uses the endpoint association information to determine the destination of data being wirelessly transmitted from the wire adapter.

In practice, the host may send a wireless data transmission request to the wire adapter through the input-output port of the wire adapter. The data transmission request may include information on the desired destination of the data transmission, typically a downstream device. In preferred embodiments, the host sends transmission information formatted similarly to transmission information currently used by the existing Wireless USB protocol. The transmission information may include a desired endpoint destination on the downstream device for which the transmission is intended. The transmission information may be sent directly to an allocation in the memory associated with an unused endpoint in the wire adapter, or the control circuitry may direct the transmission information into a similar memory allocation.

The control circuitry, possibly at the request or command of the host, selects an unused endpoint location on the wire adapter at which to bind a new VPipe. In many embodiments, the endpoint may be the endpoint represented by the memory allocation at which the transmission information is stored. The VPipe is created and bound to the selected endpoint, and paired to the endpoint on the downstream device indicated in the transmission information. In some embodiments, device association data is send to and stored in the memory of the wire adapter. In certain embodiments, the device association data is sent by the control circuitry back to the host through the input-output port.

After a VPipe has been established, a communication pathway between the wire adapter and the downstream device stays active until the VPipe is removed. When traffic destined for the same downstream device is received from the host, the control circuitry may retrieve the device association data for the particular device, and direct the transceiver to send the traffic directly to the appropriate downstream device. In some embodiments where the device association data has been communicated to the host, a driver installed in the host may direct the traffic to the appropriate VPipe, whereby the wire adapter may simply forward the traffic to the appropriate downstream device endpoint without retrieving the device association data. If a VPipe is to be removed, the association data pertaining to the downstream device is removed from the memory allocation of the bound endpoint on the wire adapter. The endpoint is unbound, and becomes available to be bound to a new VPipe and a new downstream device.

The invention therefore provides a wire adapter utilizing VPipes. Although the invention has been described with respect to certain embodiments, it should be recognized that the invention may be practiced other than as specifically described, the invention comprising the claims and their insubstantial variations supported by this disclosure.

What is claimed is:

1. A method of communicating information between a host and a plurality of functions on one or more devices, each of the functions identifiable by a device and an endpoint, comprising:

provided a wired adapter configured for wired communications with a host and wireless communications with a receiver configured for providing received information to the one or more devices, the wired adapter having a plurality of endpoints;

identifying at least some of the plurality of endpoints of the wired adapter for use in communications with corresponding ones of the functions, with each of the identified endpoints of the wired adapter identified for use with no more than one of the functions;

receiving by the wired adapter information from the host, the information being identified as being for various ones of the identified endpoints of the wired adapter; and transmitting by the wired adapter of at least some of the received information, the transmitted information including an indication of the function intended for receipt of the information, the function dependent on the wired adapter endpoint for which the information was identified.

2. The method of claim 1 further comprising removing the identification of at least one of the endpoints of the wired adapter with a corresponding one of the functions.

3. The method of claim 1 further comprising receiving by the wired adapter of information sourced by the function, the information including an indication of the endpoint of the wired adapter identified for use with the function.

4. The method of claim 3 further comprising providing the information sourced by the function to the host.

* * * * *